(12) United States Patent
Yamamoto et al.

(10) Patent No.: US 8,370,008 B2
(45) Date of Patent: Feb. 5, 2013

(54) TRAIN CONTROL SYSTEM

(75) Inventors: Junko Yamamoto, Kanagawa-ken (JP); Satoshi Iba, Tokyo (JP); Yasuyuki Miyajima, Tokyo (JP)

(73) Assignee: Toshiba Corporation, Tokyo (JP)

( * ) Notice: Subject to any disclaimer, the term of this patent is extended or adjusted under 35 U.S.C. 154(b) by 0 days.

(21) Appl. No.: 13/291,677

(22) Filed: Nov. 8, 2011

(65) Prior Publication Data

US 2012/0173055 A1    Jul. 5, 2012

(30) Foreign Application Priority Data

Nov. 9, 2010   (JP) ................................ 2010-251129

(51) Int. Cl.
*G05D 1/00*    (2006.01)
(52) U.S. Cl. ............................. 701/20; 701/19; 246/182
(58) Field of Classification Search .................... 701/19, 701/20; 246/182
See application file for complete search history.

(56) References Cited

U.S. PATENT DOCUMENTS

| | | | |
|---|---|---|---|
| 2003/0105561 A1* | 6/2003 | Nickles et al. ................. | 701/19 |
| 2003/0182030 A1* | 9/2003 | Kraeling et al. ............... | 701/19 |
| 2004/0015275 A1* | 1/2004 | Herzog et al. ................. | 701/19 |
| 2004/0093245 A1* | 5/2004 | Matheson et al. ............. | 705/7 |
| 2010/0063656 A1* | 3/2010 | Knott et al. ................... | 701/19 |
| 2011/0046827 A1* | 2/2011 | Yoon et al. .................... | 701/20 |
| 2012/0016542 A1* | 1/2012 | Severson ....................... | 701/19 |
| 2012/0259486 A1* | 10/2012 | Hrdlicka et al. .............. | 701/19 |

FOREIGN PATENT DOCUMENTS

JP    2008-249610    10/2008

* cited by examiner

*Primary Examiner* — Helal A Algahaim
(74) *Attorney, Agent, or Firm* — Baker Botts L.L.P.

(57) ABSTRACT

According to one embodiment, a train control system for a train is disclosed, the control system includes a speed detection unit configured to detect the train speed, a position detecting unit configured to detect position information of the train, a signal aspect speed receiver to receive signal aspect speed information from outside the train, an automatic train operation (ATO) unit that is configured to output a first throttle notch command to drive the train between stations and to stop the train at a target position, a specification notch pattern output unit configured to selectively output a second throttle notch control command. The signal aspect speed information includes a speed limit for a location. The first output throttle notch command is based, at least in part, on the signal aspect speed information.

10 Claims, 8 Drawing Sheets

TRAIN CONTROL SYSTEM

CROSS-REFERENCE TO RELATED APPLICATION

This application is based upon and claims the benefit of priority from Japanese Patent Application No. 2010-251129, filed Nov. 9, 2010, the entire contents of which are incorporated herein by reference.

FIELD

Embodiments described herein relate to train control systems.

BACKGROUND

Automatic Train Operation ("ATO") systems uses a train's dynamic characteristics data as model parameters to control the train. In general, the ATO's control performance is based on the accuracy of the model parameters. The performance of the ATO may affect the train's stopping placement accuracy, the driving time accuracy of the train, and the ride quality of the train.

The development of model parameters for use by an ATO system requires transient response characteristics data and stabilization acceleration data. Transient response characteristics data includes the response when the throttle notch is switched on, when the throttle notch is switched to another notch, and when the throttle notch is switched off. Stabilization acceleration data requires data corresponding to a plurality of control command of the train.

The model parameters can be identified by analyzing the result of test runs of the train for measuring the train's dynamic characteristics. The running test may also be referred to a as characteristic test. The running test may performed by having a driver activate a series of throttle notch commands at defined times. The train driver, however, may not be able to precisely perform the running test

SUMMARY

According to one embodiment, a train control system for a train, the control system includes a speed detection unit configured to detect the train speed, a position detecting unit configured to detect position information of the train, a signal aspect speed receiver to receive signal aspect speed information from outside the train, an automatic train operation (ATO) unit that is configured to output a first throttle notch command to drive the train between stations and to stop the train at a target position, a specification notch pattern output unit configured to selectively output a second throttle notch control command. The signal aspect speed information includes a speed limit for a location. The first output throttle notch command is based, at least in part, on the signal aspect speed information. The second output control command is based on a predetermined notch pattern, wherein the specification notch pattern output unit is configured to output the second throttle notch command when the train is in a specified location range. The train control system includes an output change unit configured to receive the first throttle notch command and the second throttle notch command, select one of the first throttle notch command and the second throttle notch command, and output the selected one of the first throttle notch command and the second throttle notch command to a drive and braking control device.

According to another embodiment, a method of controlling the operation of a train includes detecting a speed of the train speed, detecting position information of the train, receiving signal aspect speed information from outside the train, outputting a first throttle notch command to drive the train between stations and to stop the train at a target position, determining a location range of the train between stations based, at least in part, on position information, selectively outputting a second throttle notch control command, selecting one of the first throttle notch command and the second throttle notch command, outputting the selected one of the first throttle notch command and the second throttle notch command to a drive and braking control device. The signal aspect speed information includes a speed limit for a location. The first output throttle notch command is based, at least in part, on the signal aspect speed information. The second output control command is based on a predetermined notch pattern, wherein the specification notch pattern output unit is configured to output the second throttle notch command when the train is in a specified location range.

According to another embodiment, a train includes a plurality of wheels configured to run on rails, one or more torque generators to drive the wheels, a speed detection unit configured to detect the train speed, a position detecting unit configured to detect position information of the train, a signal aspect speed receiver to receive signal aspect speed information from outside the train, an automatic train operation (ATO), a specification notch pattern output unit, and an output change unit. The signal aspect speed information includes a speed limit for a location. The automatic train operation (ATO) unit is configured to output a first throttle notch command to drive the train between stations and to stop the train at a target position, wherein the first output throttle notch command is based, at least in part, on the signal aspect speed information. The specification notch pattern output unit is configured to selectively output a second throttle notch control command, wherein the second output control command is based on a predetermined notch pattern, wherein the specification notch pattern output unit is configured to output the second throttle notch command when the train is in a specified location range. The output change unit is configured to receive the first throttle notch command and the second throttle notch command, select one of the first throttle notch command and the second throttle notch command, output the selected one of the first throttle notch command and the second throttle notch command to a drive and braking control device.

The features and advantages of the present disclosure will be readily apparent to those skilled in the art upon a reading of the description of exemplary embodiments, which follows.

DETAILED DESCRIPTION

Figure 1:
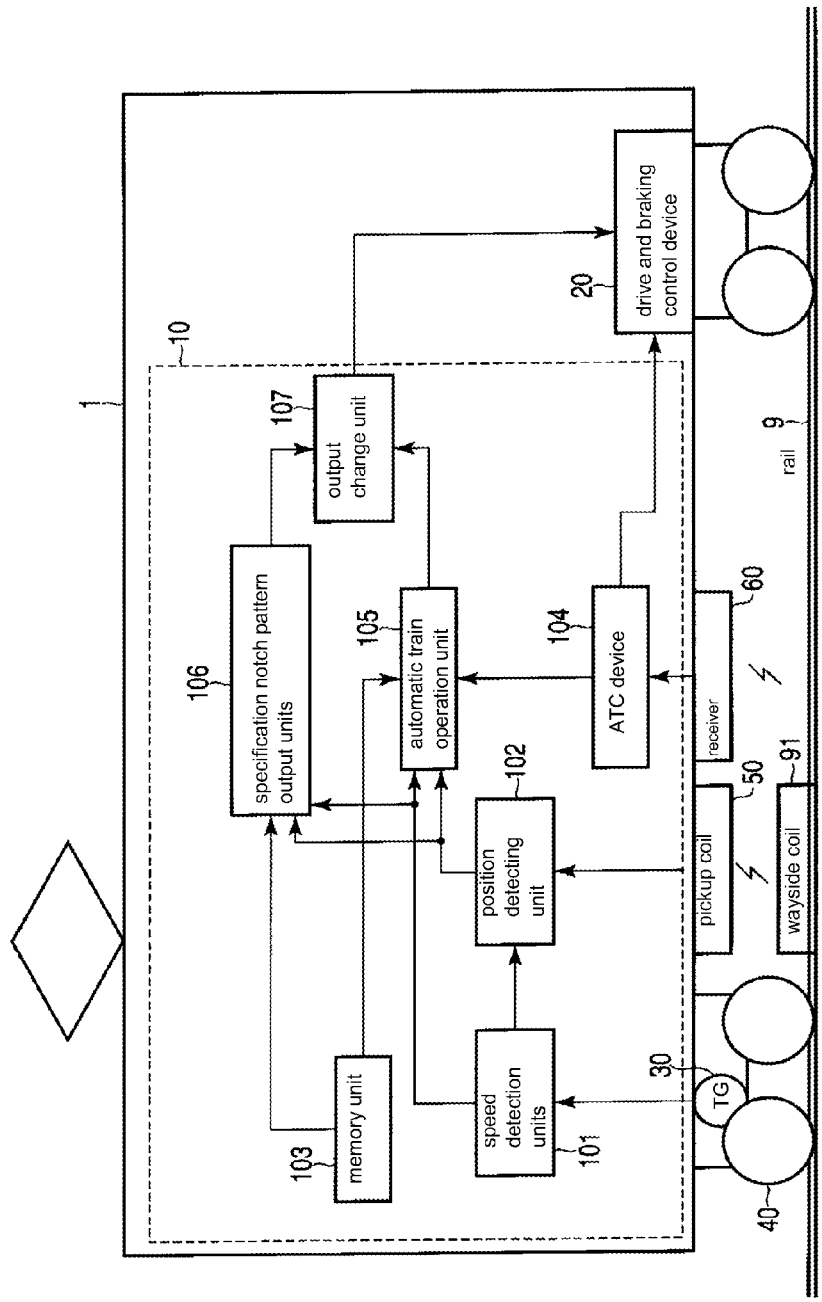
FIG. 1 is a figure showing the train controller according to a first embodiment.

Various embodiments will be hereinafter explained with reference to the drawings. Throughout the embodiments, the same structures are attached with the same reference numerals, and redundant explanations thereabout are not repeated. Each figure is a schematic view illustrating the embodiments for helping the understanding thereof. In each figure, some of shapes, sizes, ratios, and the like may be different from those in an actual apparatus. As necessary, these may be changed in design in view of the following explanation and known techniques.

A first example embodiment is described in detail with reference to figures. FIG. 1 shows a first example train controller 10. In, FIG. 1 train 1 runs on rail 9. Train 1 includes train controller 10, a drive and braking control device 20, torque generator (TG) 30, wheel 40, pickup coil 50, and receiver 60. In certain example embodiments the TG 30 is a DC motor.

The example train controller 10 includes a speed detection unit 101, a position detecting unit 102, a memory unit 103, ATC device 104, an automatic train operation ("ATO") unit 105, a specification notch pattern output unit 106, and an output change unit 107.

One example speed detection unit 101 counts the number of pulses of TG 30. Speed detection unit 101 may determine the train speed according to a circumference of wheel 40 and the number of teeth of TG 30. In other example implementations, train 1 may use a pulse generator in place of TG 30. One example position detecting unit 102 calculates distance travelled by the train by integrating the number of pulses with the train speed of TG 30. In certain example embodiments, position detecting unit 102 corrects the position determined by position detecting unit 102 based on position information received by pickup coil 50 from wayside coil 91.

In general, memory unit 103 operates as holding mechanism of a variety of information. In one example implementation, memory unit 103 stores route information, the specified location range data, specification notch pattern data, and speed limit information. In certain implementations, route information includes slope data and curvilinear data for locations along the route. Slope data is the data describing the slope of the ground at a corresponding location where train 1 runs. Curvilinear data describes the curvature of the track at a corresponding location where train 1 runs. The specified location range data describes segments of travel along the current route to associate with model parameters. Specification notch pattern data describes the train engine throttle settings (which are also referred to as notch settings) to output at corresponding locations in the current segment. Speed limit information is information about the speed limit of train 1 for locations in the corresponding location range.

The example ATC device 104 is located on-board the train 1. The ATC device 104 receives signal aspect speed information transmitted via rail 9 from a central ATC device (not shown) via receiver 60. In certain example embodiments, signal aspect speed information includes a speed limit for train 1 for the segment of track where train 1 is located. In certain example embodiments, ATC device 104 may further include a separate speed detection unit (not shown) which acquires the present train speed information. In certain embodiments, ATC 104 compares signal aspect speed information with the train speed information acquired from the separate speed detection unit. In other example embodiments, ATC device 104 obtains train speed information from speed detection unit 101 and compares that speed information with the speed limit from the signal aspect speed information. In certain example implementations, ATC 104 outputs a brake command to the drive and braking control device 20 when the train speed is above the speed limit from the signal aspect speed information.

In certain example implementations, ATO device 105 receives the signal aspect speed information from ATC 104. In other example embodiments, ATO device 105 receives signal aspect speed information. ATO device 105 outputs power running commands and brake commands to the drive and braking control device 20 according to signal aspect speed information. ATO device 105 receives slope data and curvilinear data for the current position of train 1. In certain implementations, the slope data and curvilinear data are retrieved from memory unit 103. The ATO device 105 chooses which slope data and curvilinear data to retrieve based on the train speed information acquired from speed detection unit 101, the position information, and the distance from the start of the current route, which may be acquired from position detecting unit 102. The distance from the start of the current route may be referred to as migration length information. In this embodiment, ATO device 105 functions as an acquisition unit of the slope data (which may indicate grade resistance) in a present location, or curvilinear data (which may indicate curve resistance). In certain example embodiments, ATO device 105 calculates a throttle notch command so that train 1 will run at a speed that is lower than the speed limit specified in the signal aspect speed information for the location. According to the stop position information (which, in certain example implementations, is stored in the memory unit 103) and a current distance to the end of the route (which, in certain implementations is acquired from wayside coil 91), ATO device 105 calculates a throttle notch command so that train 1 may be stopped in a stop target position. ATO device 105 outputs the calculated throttle notch command to output change unit 107. In such an implementation, ATO device 105 functions as an output unit of a notch command, which may be referred to as the first control command.

In certain implementations, specification notch pattern output unit 106 receives train speed information from speed detection unit 101, position information from position detecting unit 102, and moving distance information. Specification notch pattern output unit 106 reads the specified location range data and specification notch pattern data from memory unit 103. Specification notch pattern output unit 106 determines whether the current position is inside of the specified location range based on current position information, the distance travelled from the start of the current route, and the specified location range data. Specification notch pattern output unit 106 outputs the notch command (which may also be referred to as a second control command) read from specification notch pattern data to output change unit 107 when the train 1 is in the specified location range.

Output change unit 107 receives throttle notch commands from both specification notch pattern output until 106 and automatic train operation unit 105. If the train 1 is in a specified location range and notch pattern output unit 106 is outputting a valid throttle notch command, then output change unit 107 send the throttle notch command from specification notch pattern output until 106 to drive and braking control device 20. In other words, in certain implementations, output change unit 107 gives priority to the notch command of specification notch pattern output unit 106 during the output of the notch command of specification notch pattern output unit 106. If the train 1 is not in a specified location range or if the specification notch pattern output unit 106 is not outputting a throttle notch command, then the output change unit outputs the throttle notch command from the ATO unit 105 to the drive and braking control device 20. In certain implementations, the output change unit 107 determines if the throttle notch command from notch pattern output unit 106 is an invalid throttle notch command, then, then the output change unit 107 outputs the throttle notch command from the ATO unit 105 to the drive and braking control device 20. In such a situation, output change unit 107 may set a flag to indicate that notch pattern output unit 106 has output an invalid value. If, in that situation, the notch pattern output unit 106 later outputs a valid throttle notch command again, the output change unit 107 may output the valid throttle notch command from the notch pattern output unit 106 and unset the flag showing that the output from notch pattern output unit 106 is invalid.

A drive and braking control device 20 drives and brakes wheel 40 according to the brake command from ATC device 104 or the power running and brake command from output change unit 107. Train 1 moves on rail 9 by the drive or braking of wheel 40, which is controlled by a drive and braking control device 30.

Figure 2:
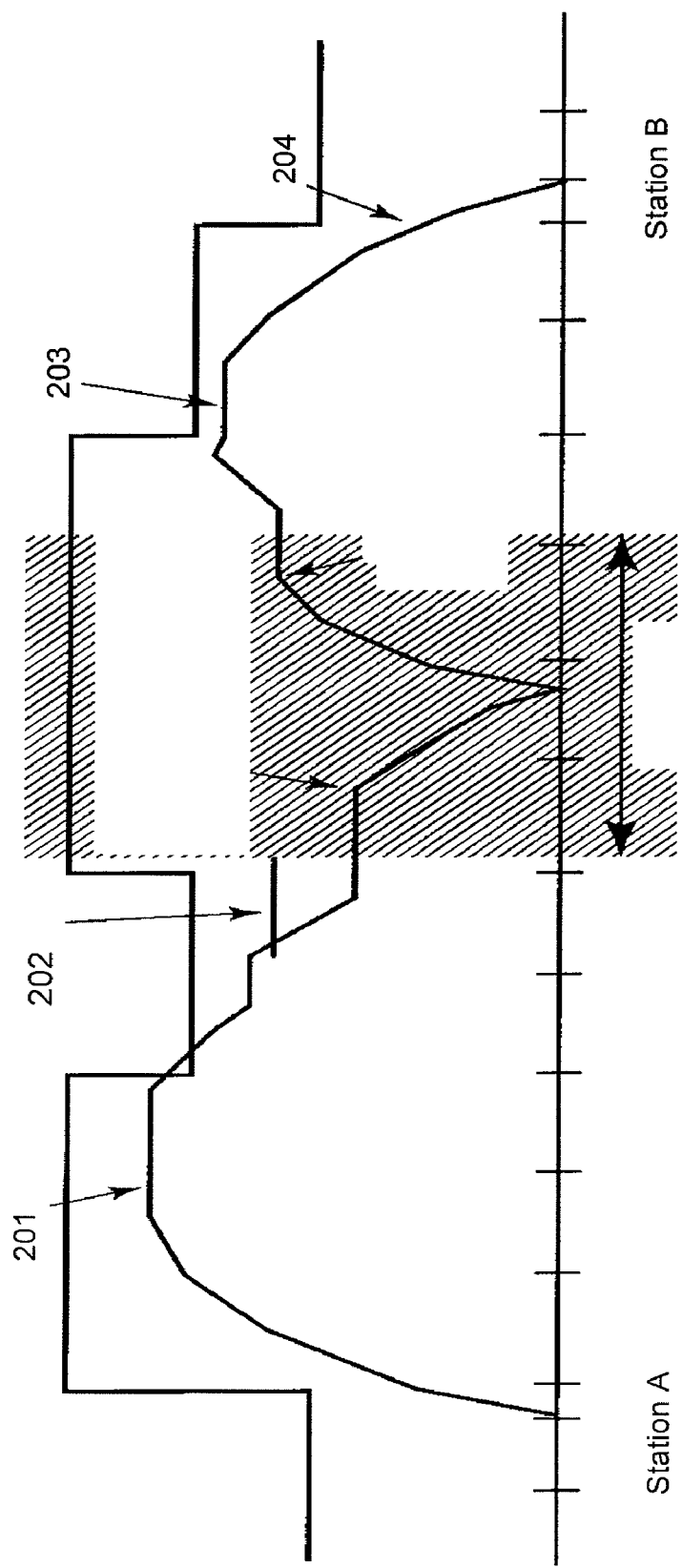
FIG. 2 is a figure showing the operation of the train controller.

FIG. 2 is a figure showing the movement of train 1 between stations A and B. The specified location range is defined between station A and station B.

First, train 1 leaves station A according to a notch command by ATO device 105. In one embodiment, train 1 moves by automatic operation at a signal aspect speed 201 until it approaches the specified location range, 202, which is indicated in FIG. 2 by crosshatching. From the constant distance near side of the specified location range up to the starting position of the specified location range, ATO device 105 reads the speed limit information from memory unit 103, and establishes virtual speed limit. This virtual speed limit is the speed limit read from memory unit 103 modified by a margin speed to activate the brake in the specified location range. ATO device 105 outputs a throttle notch command so that the speed of train 1 is lower than the virtual speed limit.

From the station start-up up to the specified location range, specification notch pattern output unit 106 has set the notch command as an invalid value. ATO device 105 is setting up the virtual speed limit of train 1, and can set up the start speed of a specification notch pattern. The investigator can get different data according to start speed because ATO device 105 sets the start speed of a specification throttle notch pattern as a different value.

When train 1 moves into the specified location range, specification notch pattern output unit 106 will output a notch command to output change unit 107 according to a specification notch pattern read from memory unit 103. After moving into the specified location range, specification notch pattern output unit 106 sets a notch command as an valid value. Output change unit 107 transmits the throttle notch command from specification notch pattern output unit 106 to a drive and braking control device 20. The specification notch pattern which specification notch pattern output unit 106 outputs contains the notch pattern shown below. The example throttle notch pattern for the range shown in FIG. 2 includes portions where the throttle is held steady, portions where the throttle is increased, portions where the throttle is decreased, and portions where the throttle is turned completely off and then back on again.

As train 1 moves by these notch patterns, recorder 103 records the setting acceleration characteristic of a notch, acceleration hysteresis when a notch is taken up and down, data about the transient response characteristic when a notch is put in, when it switches, or when it cuts. In certain example implementations recorder 103 is a computer used for measurement. Recorder 103 receives notch command data and speed data required to build a model parameter of the dynamic characteristics of train 1.

Because acceleration data can be calculated if speed data is differentiated, relation between a notch and acceleration can be analyzed and a model parameter can be identified. In certain implementations, the identification of the parameter in the analysis of data is performed with a computer for manual analysis. In other implementations, the identification is performed by an analysis tool.

In certain implementations, model parameter are identified by a model parameter identification unit mounted on a car, which may fit the model of a basic form according to notch command data and speed data. Acceleration may be calculated with ATO device 105 and it may be recorded. In certain implementations, position data is also recorded in addition to notch command data and speed data, allowing identification of a more exact model parameter to be attained.

In certain implementations, changes in acceleration due to grade resistance or curve resistance are calculated based on position data, slope data, and curvilinear data. Determining changes in acceleration due to grade resistance or curve resistance becomes possible by deducting acceleration data calculated with speed data from this acceleration. In certain implementations, ATO device 105 corrects acceleration according to slope data and curvilinear data corresponding to the current position. ATO device 105 may further record the corrected acceleration data. Acceleration may be corrected to account for grade resistance and curve resistance in a current position. In this case, the acceleration data, which can be assumed to be a thing when train 1 is moving flatness and a straight line from which the influence of a slope or a curve was removed is obtained. If this adjustment to acceleration data is performed, the model parameter of the dynamic characteristics for train 1 will be more precise.

In certain implementations, specification notch pattern output unit 106 causes the train coast for a fixed period of time from the start of the specified location range. In certain implementations, the specification notch pattern output unit 106 outputs a brake for the first half of the range and it may output the specification notch pattern of power running for the second half of the range. In this case, even if train 1 is running while specification notch pattern output unit 106 is outputting the specification notch pattern, the possibility of exceeding signal aspect speed is reduced. Train controller 10 may make an announcement concerning the testing. In this case, anxiety over a sudden slowdown and acceleration of train 1 can be reduced.

After train 1 reaches the end of the specified location range, specification notch pattern output unit 106 will set a notch command as an invalid value. In one implementation, the last of a specification throttle notch pattern from the notch pattern output unit 106 loosens a brake and, after securing sufficient coasting time for acceleration to set, 203, the specification notch pattern output unit 106 begins to output an invalid values for throttle notch patterns. Once notch pattern output unit 106 has completed its pattern and beings outputting invalid output, the output change unit 107 resumes transmitting the throttle notch command from ATO device 105 to the drive and braking control device 20. ATO device 105 outputs a throttle notch command so that the train will travel at a speed that is the signal aspect speed modified by margin speed lower. In certain implementations, train 1 attempts to recovers from the delay caused by running the specification notch pattern output 106 without exceeding the signal aspect speed.

As train 1 approaches the destination station, ATO device 105 will control the train 1 stop at station B by, for example, using a Train Automatic Stropping Controller (TASC), 204. In certain implementations, ATO device 105 is configured to perform only traveling control which met signal aspect speed. In such an implementation a driver may control train 1 to stop at station B by manual intervention.

Figure 3:
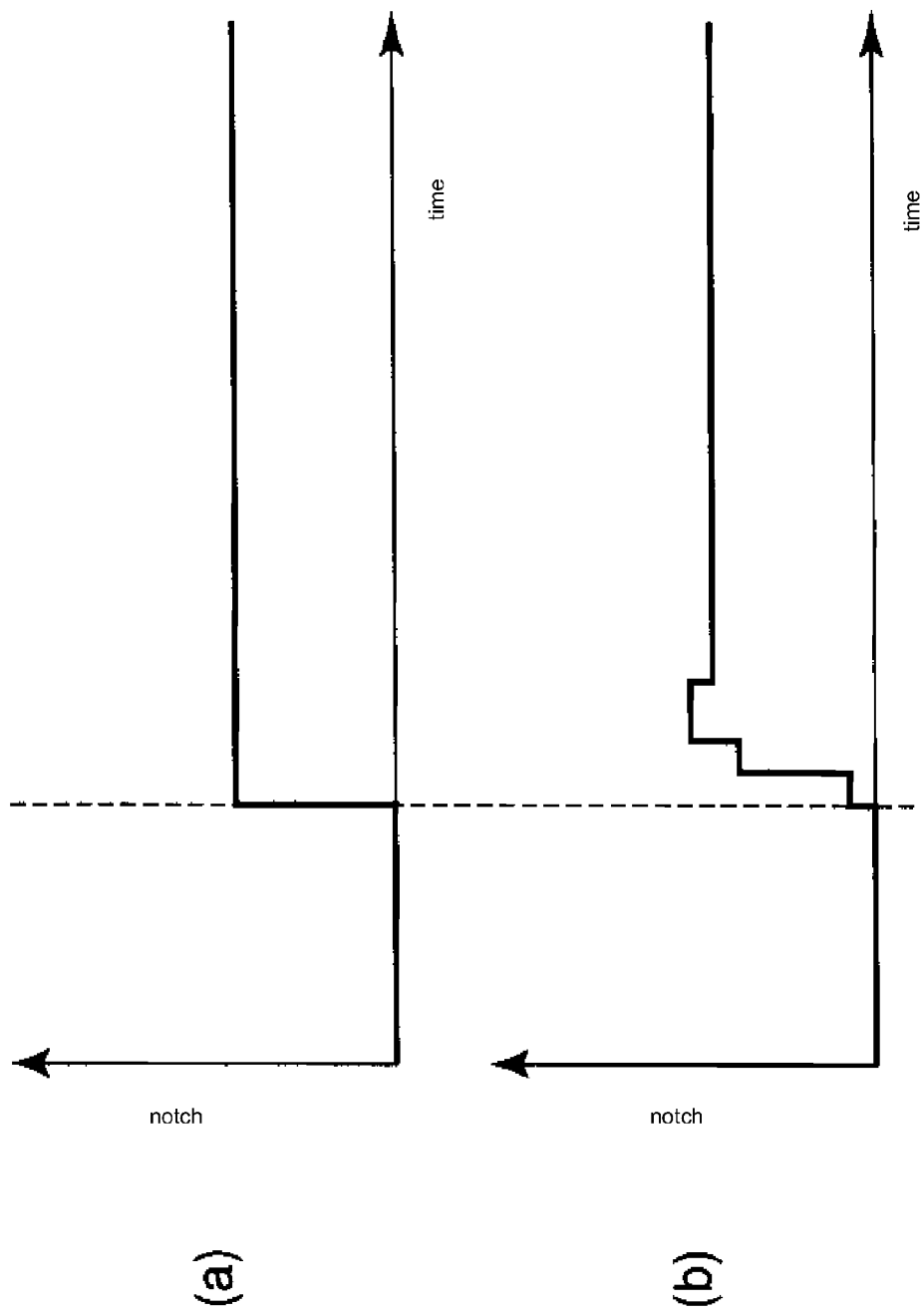
FIG. 3 is a figure showing time change of the notch outputted according to the specification notch pattern by automatic operation and the manual operative method by the train controller according to the present disclosure.

FIG. 3 is an example difference between the output of the notch command by specification notch pattern output unit 106 and the output of the notch command by manual handle. FIG. 3 is a figure showing the example of time change of a notch command inputted into a drive and braking control device 20, when it is going to output a notch command according to a specification notch pattern. FIG. 3(*a*) shows a throttle notch pattern from notch pattern output unit 106, which generates the throttle notch command automatically. Because specification notch pattern output unit 106 outputs precisely, the specified notch pattern which changes in the shape of a step, and step response data is obtained. On the other hand, FIG. 3(*b*) is a figure of an example throttle notch command created manually by a driver. When a driver inputs the specified notch pattern which changes in the shape of a step, the driver may sometimes input an (unwanted) intermediate notch, or the driver may overshoot the notch and have to return it to the correct position, which may not permit a notch function to be obtained.

Figure 4:
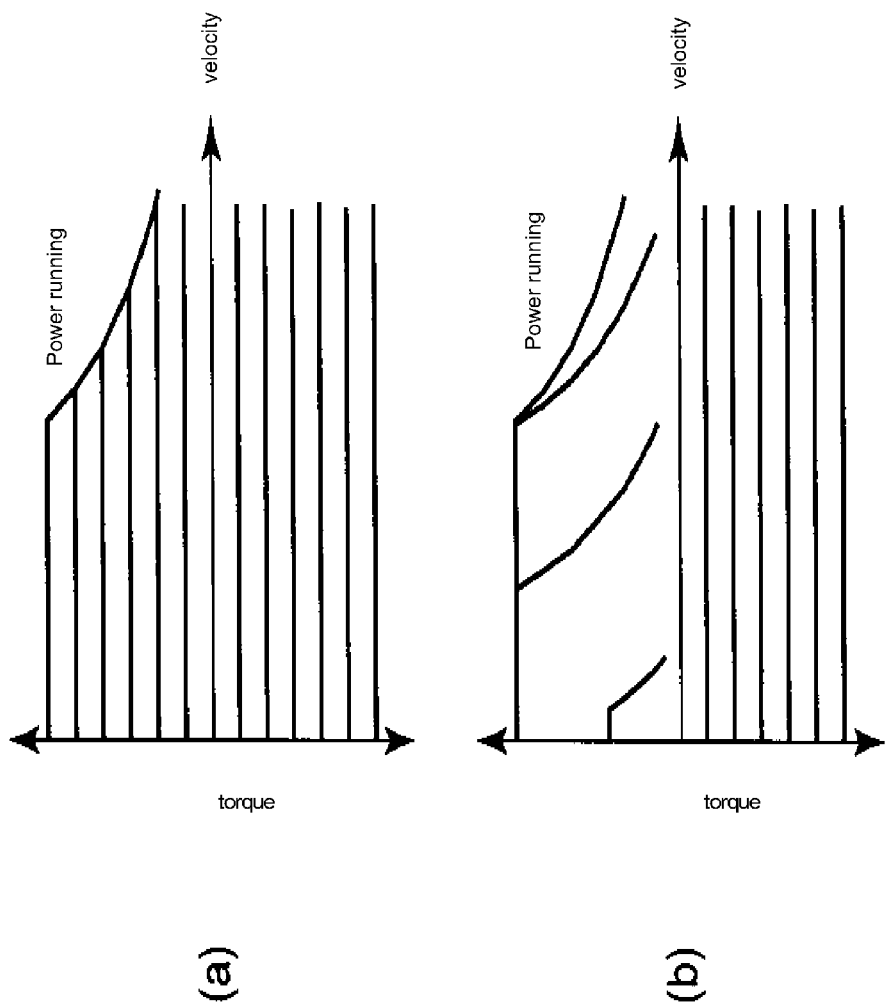
FIG. 4 is a figure showing the example of the setting acceleration characteristic for notches acquirable by automatic operation and the manual operative method by the train controller of the present disclosure.
Figure 5:
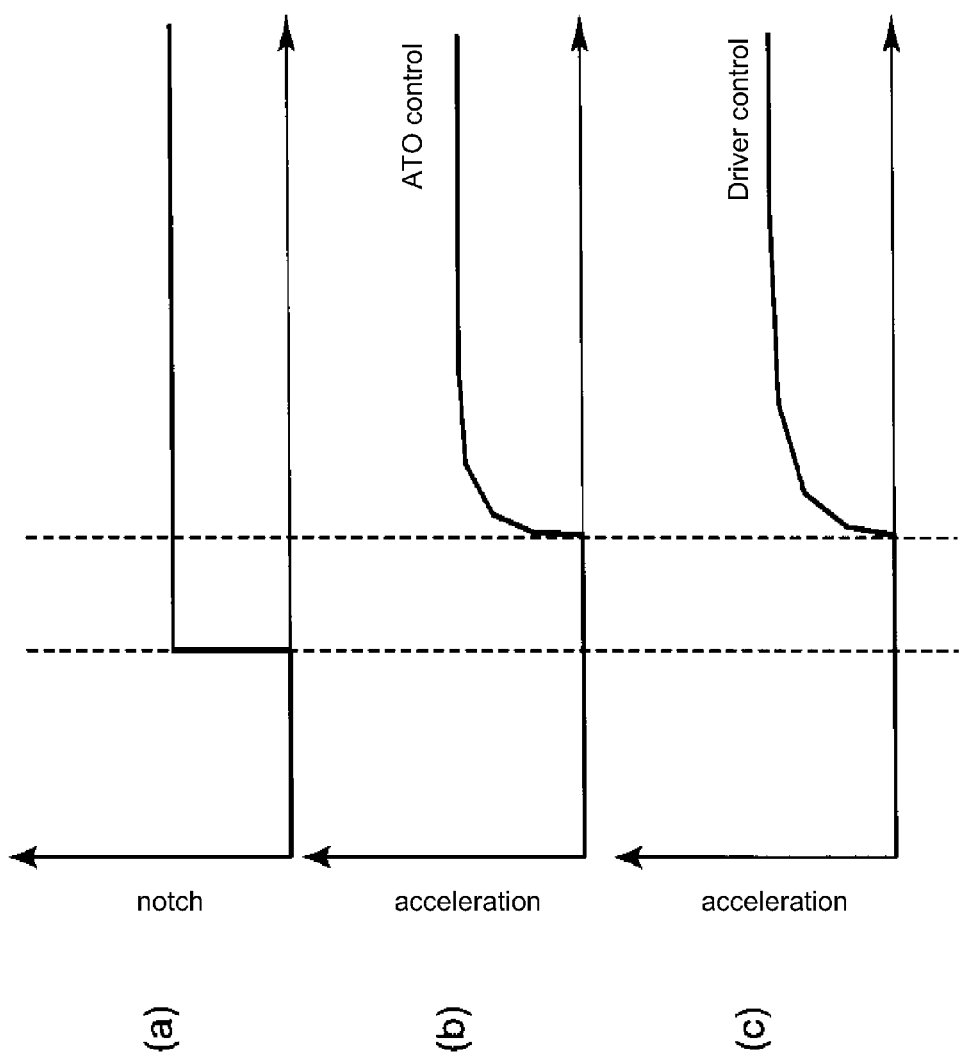
FIG. 5 is a figure showing the example of the response characteristic of the acceleration after a notch command input

FIGS. 4 and 5 illustrate differences in the train dynamic characteristics between a train under automatic operation and a train is under manual operation. FIG. 4 is a figure showing the static characteristic (characteristic at the time of setting) of the acceleration for every notch. FIG. 4(*a*) is a figure showing the example of the static characteristic set to the motor during automatic operation. FIG. 4 (*b*) is a figure showing the example of the static characteristic set to the motor for manual operations. In this example, the static characteristic during automatic operation has many notch stages and is fixed, unlike the static characteristic during the manual operative method, which are not fixed.

FIG. 5 is a figure showing the transient response characteristic of acceleration in response to a change in the notch command. FIG. 5(*a*) is a figure showing change of a notch command versus time. FIG. 5(*b*) is a figure showing an example of the transient response characteristic set to the motor for a train under automatic operation. On the other hand, FIG. 5(*c*) is a figure showing the example of the transient response characteristic to the motor for a train under manual operation. The delay between the notch command change and the corresponding increase in acceleration is shorter while the train is under automatic control.

As shown in FIGS. 4 and 5, the static characteristic and transient response characteristics of acceleration versus time differ between automatic operation and manual operation. Because the ATO device 105 is performed according to the model parameter of dynamic characteristics, it is useful to acquire the data for building the model parameter of dynamic characteristics by automatic operation, rather than manual operation. Imprecision in the operation of ATO device 105 may be introduced by the difference between static characteristics acquired by manual operation.

Figure 6:
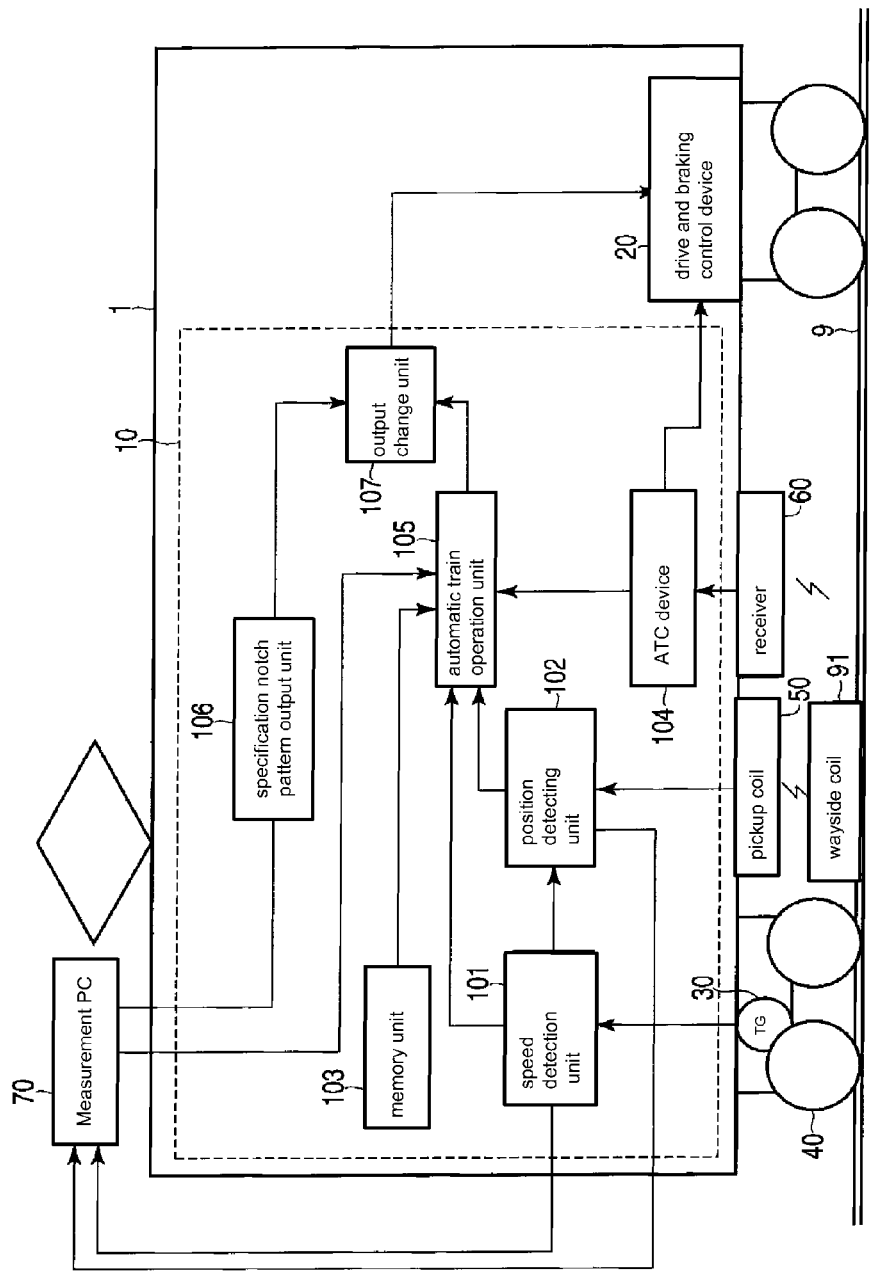
FIG. 6 is a figure showing the train controller according to a second embodiment.

A second example embodiment of the train control system is shown in FIG. 6. Measurement computer 70 is connected to train controller 10. In one example embodiment, measurement computer 70 stores the specified location range data, specification throttle notch pattern data, and speed limit information. In one example embodiment, measurement computer 70 outputs the specified location range data and specification throttle notch pattern data to specification notch pattern output unit 106.

Measurement computer 70 outputs speed limit information to ATO device 105. Measurement computer 70 receives train speed information, the position information from position detecting unit 102, and moving distance information from speed detection unit 101. Therefore, measurement computer 70 can obtain data for identifying the model parameter of a static characteristic and the transient response characteristic.

In one example embodiment, computer 70 may indicate to specification notch pattern output unit 106 when the a current position is in the specified location range. Computer 70 may determine that the current location is in the specified location range based, for example, on the output of position detecting unit 102.

Figure 7:
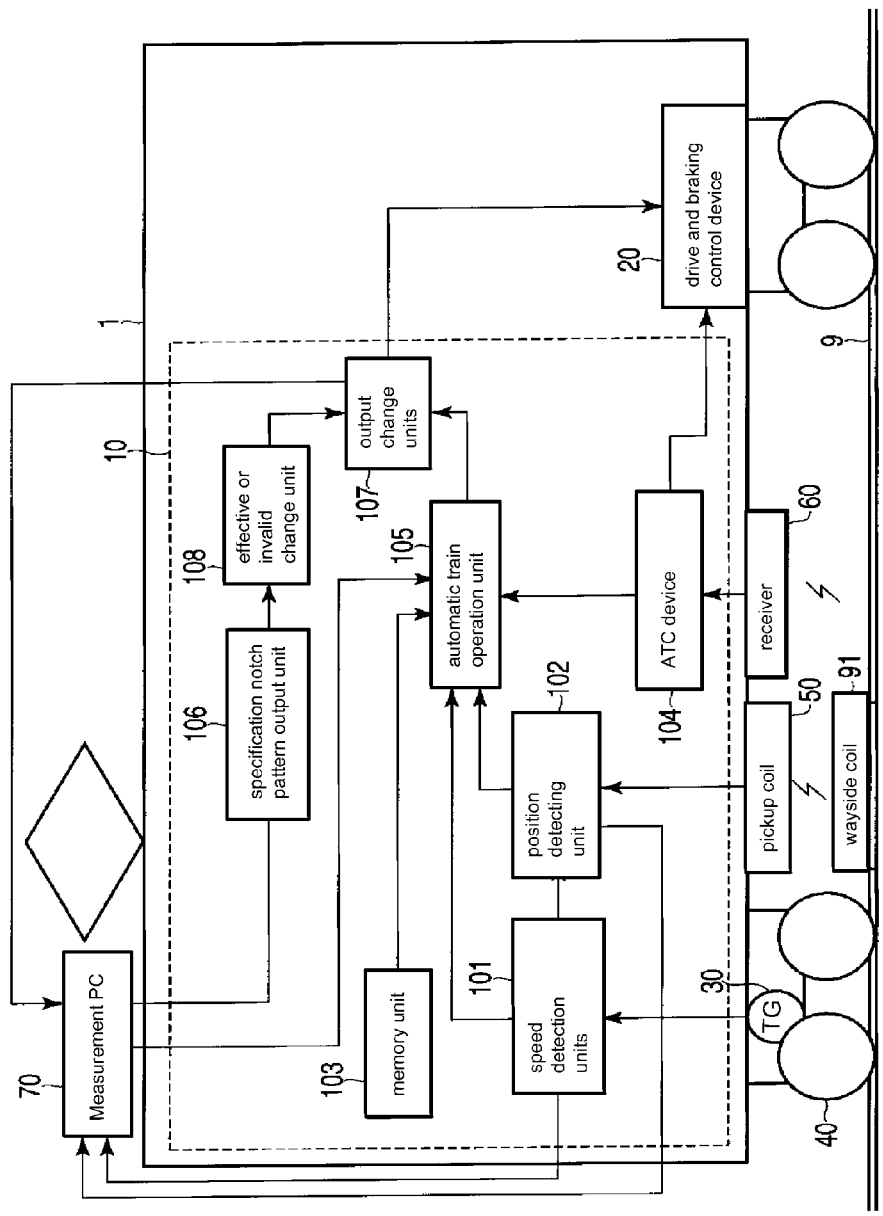
FIG. 7 is a figure showing the train controller according to a third embodiment.

A third example embodiment of the train control system is shown in FIG. 7. Valid or invalid change unit 108 is connected between specification notch pattern output unit 106 and output change unit 107. Valid or invalid change unit 108 causes notch pattern output unit 106 to alternatively produce valid or invalid throttle notch commands. In one example embodiment, when a test run starts for a characteristic test, a characteristic test enforcer sets the valid or invalid change unit 108 to "valid." In certain example embodiments the test enforcer may be the driver or another human. Valid or invalid switching unit 108 enables it to output a valid output of specification notch pattern output unit 106, while it has been valid. In certain example embodiments, set valid or invalid change unit 108 as "valid" when recorders, such as measurement computer 70, are connected to the train controller 10. In such an embodiment, even if a characteristic test enforcer fails to switch valid or invalid change unit 108 to "invalid" from "valid" at the time of the end of a test run for a characteristic test, valid or invalid change unit 108 does not output the specification notch pattern from specification notch pattern output unit 106 when recorders, such as measurement computer 70, are not connected to the train controller. In certain embodiments, valid or invalid change unit 108 can prevent the function of specification notch pattern output unit 106 affecting the usual ATO functionality. In certain example embodiments, valid or invalid change unit 108 may be incorporated in train controller 10.

Figure 8:
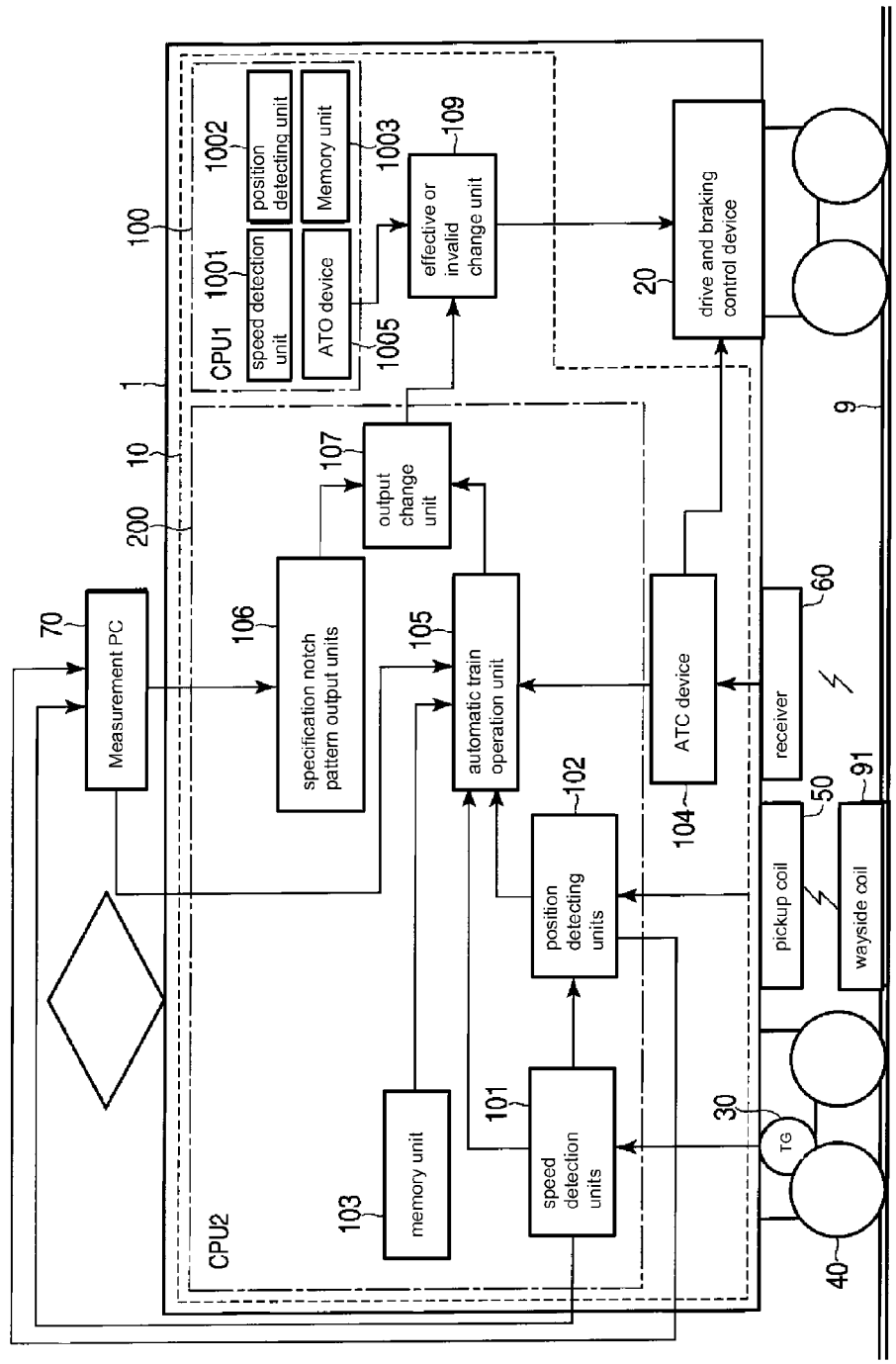
FIG. 8 is a figure showing the train controller according to a fourth embodiment.

A fourth example embodiment of the train control system is shown in FIG. 8. Train controller 10 includes a first CPU 100 and a second CPU 200. The first CPU 100 (control section) includes with speed detection unit 1001, position detecting unit 1002, memory unit 1003, and ATO device 1005. Speed detection unit 1001, position detecting unit 1002, memory unit 1003, and ATO device 1005 are the respectively same composition as speed detection unit 101, position detecting unit 102, memory unit 103, and ATO device 105, they omit explanation. Second CPU(control section) 200 includes with speed detection unit 101, position detecting unit 102, memory unit 103, ATO device 105, specification notch pattern output unit 106, and output change unit 107. That is, train controller 10 includes with two CPUs including the function of an ATO device. The first CPU 100 has a function which outputs the notch command for moving along with signal aspect speed to operation, and usually stopping in the station regular position. The second CPU 200 usually has not only the notch command output for operation but also a function which outputs a specification notch pattern during a running test.

Valid or invalid change unit 109 is between ATO device 1005 of first CPU 100, output change unit 107 of CPU 200 of a second valid or invalid change unit 109 is a switch which sets up whether either notch command of the first CPU 100 and second CPU 200 is validated. Valid or invalid change unit 109 transmits the notch command outputted, based on which is valid, to a drive or braking control device 20.

In certain example embodiments, valid or invalid change unit 109 validates the output from second CPU 200 when recorders, such as measurement computer 70, are connected to the train controller. In this case, valid or invalid change unit 109 gives priority to a notch command of CPU 200 of a second. Valid or invalid change unit 109 operates as an output change unit of a notch command. Even if a characteristic test enforcer forgets to invalid second CPU 200 at the time of the end of a test run for a characteristic test, valid or invalid change unit 109 does not output the specification notch pattern from second CPU 200 when recorders, such as measurement computer 70, are not connected to the train controller. That is, a specification notch pattern output function with which second CPU 200 is included does not influence the usual automatic operation function.

According to the train controller of embodiments described above, it becomes possible to acquire more accurate step response data, without putting a burden on a driver to manually perform a running test. As a result, it becomes possible to identify accurate dynamic-characteristics model parameter about train 1.

While certain embodiments of a vehicle drive system have been described, these embodiments have been presented by way of example only, and are not intended to limit the scope of the disclosure. Indeed, the novel systems described herein may be embodied in a variety of other forms; furthermore, various omissions, substitutions and changes in the form of the systems described herein may be made without departing from the spirit of the disclosure. The accompanying claims and their equivalent are intended to cover such forms or modifications as would fall within the scope and spirit of the disclosure.

What is claimed is:

1. A train control system for a train, the control system comprising:
   a speed detection unit configured to detect the train speed;
   a position detecting unit configured to detect position information of the train;
   a signal aspect speed receiver to receive signal aspect speed information from outside the train, wherein the signal aspect speed information includes a speed limit for a location;
   an automatic train operation (ATO) unit that is configured to output a first throttle notch command to drive the train between stations and to stop the train at a target position, wherein the first throttle notch command is based, at least in part, on the signal aspect speed information;
   a specification notch pattern output unit configured to selectively output a second throttle notch command, wherein the second throttle notch command is based on a predetermined notch pattern, wherein the specification notch pattern output unit is configured to output the second throttle notch command when the train is in a specified location range; and
   an output change unit configured to:
   receive the first throttle notch command and the second throttle notch command;
   select one of the first throttle notch command and the second throttle notch command;
   output the selected one of the first throttle notch command and the second throttle notch command to a drive and braking control device; and
   a memory unit configured to store the train model parameters, wherein the memory unit further stores slope and curvilinear data for locations along the train route and wherein the ATO determines the first throttle notch command, based, at least in part, on the slope and curvilinear data corresponding to the location of the train.

2. The train control system of claim 1, wherein the predetermined notch pattern for output by the specification notch pattern output unit is used to determine train model parameters, the train model parameters including transient response characteristic data and stabilization data.

3. The train control system of claim 2, wherein the ATO unit is further configured to output the first throttle notch command based, at least in part, on one or more train model parameters.

4. The train control system of claim 1, wherein the specification notch pattern output unit is further configured to output an invalid second throttle notch command when the train is outside of the specified location range and wherein the output change unit is configured to select the second throttle notch pattern when the second throttle notch command is valid.

5. The train control system of claim 1, further comprising:
   a recorder configured to record acceleration data when the train is controlled by the specification notch pattern output unit; and
   a calculating unit configured to determine the train model parameters, based, at least in part, on the acceleration data.

6. A method for controlling a train comprising:
   detecting a speed of the train by a speed detection unit;
   detecting a position information of the train by a position detecting unit;
   receiving signal aspect speed information from outside the train by a signal aspect speed receiver, wherein the signal aspect speed information includes a speed limit for a location;
   outputting a first throttle notch command to drive the train between stations and to stop the train at a target position by an automatic train operation (ATO) unit, wherein the first throttle notch command is based, at least in part, on the signal aspect speed information;
   selectively outputting a second throttle notch command by a specification notch pattern output unit, wherein the second throttle notch command is based on a predetermined notch pattern, wherein the specification notch pattern output unit is configured to output the second throttle notch command when the train is in a specified location range;
   receiving the first throttle notch command and the second throttle notch command by an output change unit ;
   selecting one of the first throttle notch command and the second throttle notch command by the output change unit ;
   outputting, by the output change unit, the selected one of the first throttle notch command and the second throttle notch command to a drive and braking control device; and
   storing, by a memory unit, the train model parameters, wherein the memory unit further stores slope and curvilinear data for locations along the train route and wherein the ATO determines the first throttle notch command, based, at least in part, on the slope and curvilinear data corresponding to the location of the train.

7. The method of claim 6, wherein the predetermined notch pattern for output by the specification notch pattern output unit is used to determine train model parameters, the train model parameters including transient response characteristic data and stabilization data.

8. The method of claim 7, further comprising outputting the first throttle notch command by the ATO unit based, at least in part, on one or more train model parameters.

9. The method claim 6 further comprising outputting an invalid second throttle notch command by the specification notch pattern output unit when the train is outside of the specified location range and selecting the second throttle notch pattern by the output change unit when the second throttle notch command is valid.

10. The method of claim 6, further comprising:
recording acceleration data by a recorder when the train is controlled by the specification notch pattern output unit; and
determining the train model parameters by a calculating unit, based, at least in part, on the acceleration data.

* * * * *